Oct. 13, 1959 E. HASLETT 2,908,095
METHOD OF MAKING ARTIFICIAL FLOWERS
Filed May 25, 1953 2 Sheets-Sheet 1
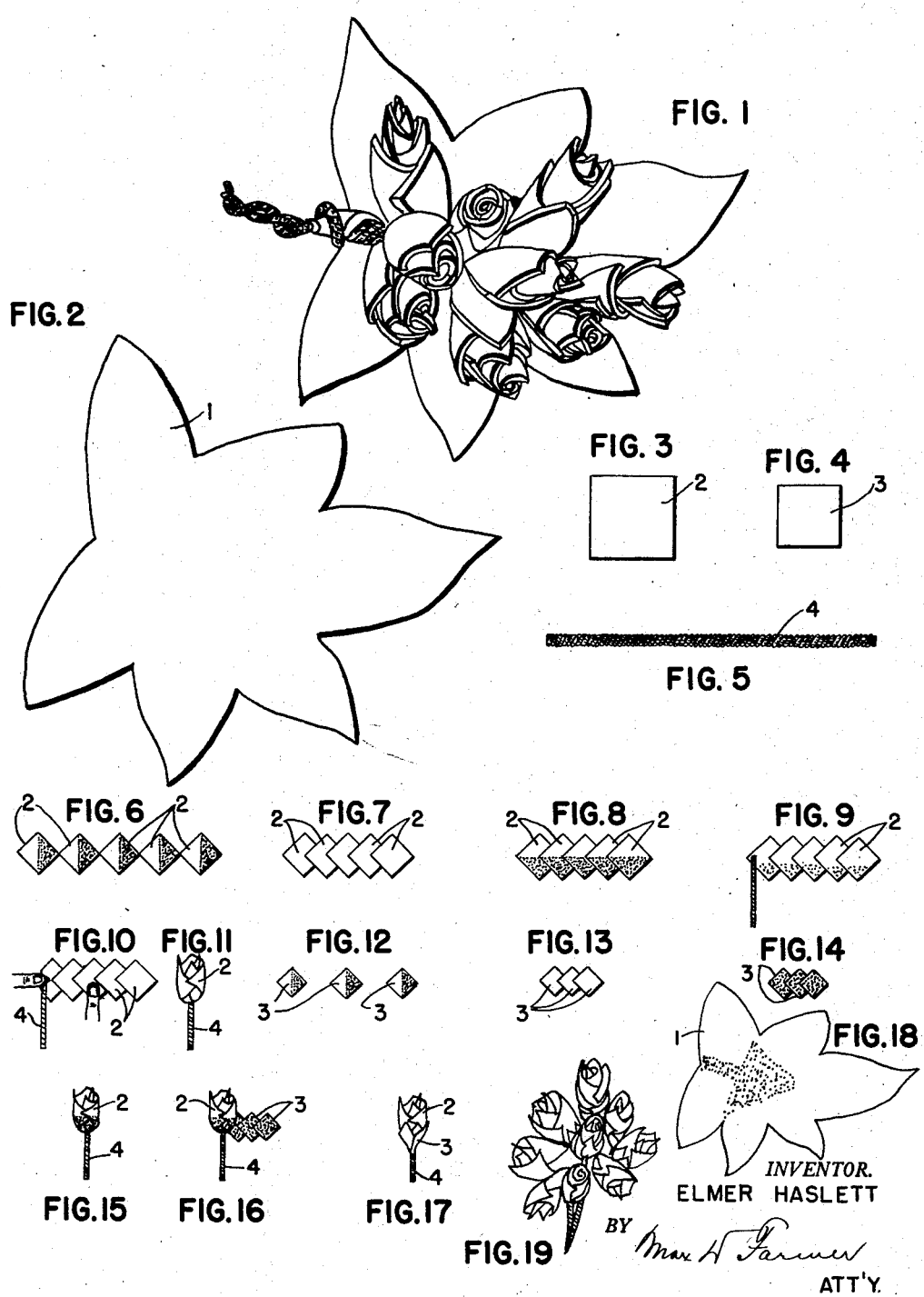
INVENTOR.
ELMER HASLETT
BY
ATT'Y.

Oct. 13, 1959  E. HASLETT  2,908,095
METHOD OF MAKING ARTIFICIAL FLOWERS
Filed May 25, 1953  2 Sheets-Sheet 2

FIG.20 FIG.21 FIG.22 FIG.23 FIG.24 FIG.25
FIG.26 FIG.27 FIG.28 FIG.29 FIG.30 FIG.31
FIG.32 FIG.33 FIG.34 FIG.35 FIG.36 FIG.37
FIG.38 FIG.39 FIG.40 FIG.41 FIG.42 FIG.43
FIG.44
FIG.45 FIG.46 FIG.47 FIG.48 FIG.49
FIG.50 FIG.51 FIG.52 FIG.53 FIG.54 FIG.55
FIG.56 FIG.57 FIG.58 FIG.59 FIG.60
FIG.61
FIG.62 FIG.63 FIG.64 FIG.65 FIG.66
FIG.67 FIG.68 FIG.69 FIG.70 FIG.71 FIG.72
FIG.73 FIG.74 FIG.75 FIG.76

INVENTOR.
ELMER HASLETT
BY
ATT'Y.

United States Patent Office 2,908,095
Patented Oct. 13, 1959

2,908,095

METHOD OF MAKING ARTIFICIAL FLOWERS

Elmer Haslett, Forest Hills, N.Y.

Application May 25, 1953, Serial No. 357,093

1 Claim. (Cl. 41—13)

Artificial flowers are not new as such in the art. They are fabricated from a wide variety of relatively thin materials; those that are flexible are mostly from paper and fabrics, those that are semi-flexible are mostly from compositions such as wood pulp, plastics, and those that are non-flexible are mostly from waxes and ceramics.

To secure the desired contours of petals and leaves in flexible and semi-flexible flowers after the material is die-cut, the material is impregnated with starch, gelatin or other stiffening agents, molded into form by compression or heat, or in the case of certain crepe paper flowers, the contour is obtained by stretching the crepe. Certain dyes are used to obtain color effects and is applied either before or after the molding or forming process. The assembly or cementing is accomplished either by the application of cement or by sewing.

The principal disadvantages to such flexible or semi-flexible flowers are that they cannot be made to retain their original fresh appearance due to difficulties of washing and secondly in the wearing of these flowers as corsages, boutonnieres, and the like, they become crushed and will not retain their shape or contour except when made of a very hard material. When made of a very hard material they are not pleasant to the touch and are disturbing to wear because of their sharpness which scratches and irritates the skin. This hardness has an abrasive action on sheer dresses and coat linings, and when worn under a coat cause an unsightly lump or bulge in the coat that detracts from an otherwise neat appearance. Likewise, because of the inherent fragility there is considerable damage and deterioration in shipping.

Upon close examination, the flexible flowers do not resemble real flowers, since the petal or leaf of a real flower is a homogeneous composition while most flexible and semi-flexible materials used in artificial flower making are heterogeneous.

In the illustrated embodiment of the invention:

Fig. 1 is a front view of a branch of a rose bush with a group of rose buds thereon, all constructed in accordance with this invention;

Fig. 2 is a plan of one of the leaf shapes froming part of Fig. 1;

Fig. 3 is a plan of one of the petal shapes forming part of Fig. 1;

Fig. 4 is a plan of one of the culot shapes forming part of Fig. 1;

Fig. 5 is a plant of a pipe cleaner forming part of Fig. 1;

Figs. 6 to 19 inclusive are diagrams illustrating the various steps by which the parts of Figs. 2 to 5 inclusive are converted into the rose bud group shown in Fig. 1;

Figs. 20 to 43 inclusive are diagrams showing the steps in making a pansy;

Figs. 44 to 60 inclusive are diagrams showing the steps in making a ranunculus; and Figs. 61 to 76 inclusive are diagrams showing the steps in making a daffodil.

I have discovered that through the use of certain techniques, I can take a highly porous, cellular, stretchable, resilient and relatively thick material, preferably about $\frac{1}{16}$ of an inch thick, and can easily form from it flowers that very closely resemble real flowers in contour and appearance, and eliminate the disadvantages previously outlined, that are simple to make requiring no machinery or stiffening (impregnating) process. In the development of these flowers, I use a good grade of split foam latex previously dyed to desired shades. This foam latex is sold as slabs or rolls, approximately 1 inch in thickness with a skin surface on either side; and, after dyeing through the conventional processes. I split it into thinner sheets ranging from $\frac{1}{8}$ of an inch to $\frac{1}{32}$ of an inch. The splitting is accomplished through conventional and knows processes. The leaves or petals and culots are then either cut with an ordinary scissors or die-cut through conventional processes. The skin portion can be used in making certain type of smooth leaves, though for most flower petals the split surfaces, skin removed, are more highly desirable, not only for their appearance but because of their additional flexibility.

In the making of these flowers, I use a quick setting non-retacking cement that is flexible upon setting, such as a plastic cement or neoprene cement with a volatile solvent. This cement can be either clear (or colored if a tinting effect is desired, as will hereinafter be described) but without relation to the primary function of the adhesive.

For stems, I use two finely twisted wires into which cloth has been inserted during the twisting, and which I dye to the desired color. This stem not only resembles a stem in appearance but gives the start of my flower a stronger and wider surface, and an absorbent base for immediate and positive adhesion of the peps, leaves, and petals. Furthermore it can be twisted, bent, or otherwise shaped as desired. The surface friction of the interwoven fabric also holds the twisted portion about another stem without necessity of cementing, which is a feature in making corsages or decorative sprays, because often the user may desire to disassemble corsages or sprays and have straight stems for decorative flowers or like purposes. These stems for the smaller flowers or those desiring short stems up to 6 inches can be ordinary conventional pipe stem cleaners. For larger flowers with long stems heavier wire can be used or stem cleaner wire can be woven or braided for added strength.

In the making of these flowers with foam latex, I have discovered that upon applying the cement, the solvent therein causes the material to expand where applied, and that the compressibility of the cemented portion toward the stem portion of the flower of such a highly porous, stretchable and resilient cellular material, as expanded or contracted, causes the petals and leaves to take on natural characteristics of contour when the solvent dries and the material at that portion is unable to resume its natural shape. This I believe is due to the fact that the adhesion or cohesion takes place before the solvent is fully evaporated and the material does not contract fully until the solvent has all evaporated. Thus, I find that upon applying cement to the lower quarter of a square inch of material, the end to which the cement is applied will almost instantly expand approximately 20%. This may be pressed on another piece of material and will immediately take an initial set, but at the end of the final set which, depending on the solvent, I use but which is approximately 10 minutes, the balance of the material instead of lying flat will curve along the lines of the contour of the flower. The degree of this curvature and contour conformity will somewhat depend upon the thickness of the material, density, and the amount of saturation of the solvent of the adhesive. This phenomena is somewhat accentuated, of course, by the manual curvature of certain petals and leaves in certain flowers when applied to a narrower stem or pep.

I eliminate the necessity of molding, impregnation, crimping or other mechanical needs previously used to accomplish this reaction. I have discovered also, that stretching of the outer tip of any portion of the material shortly after applying cement and before its set is completed, likewise causes an unsupported leaf or a petal to take on characteristics of a concave or convex nature. Likewise, by similar application of cement at any particular portion of the leaf or petal, I can make a large number of frills, curls, and other desirable contour characteristics by making sharp indents with a finger nail or a pointed tool, or by rolling the edge slightly at any point. This effect is due to the fact that increased tension by compressing a porous surface or by cementing two portions of the surface together with a minute fold, the tension is spread out in a wide sweeping curve due to the soft resiliency and stretchability of the material.

The advantages of these techniques result in flowers that are most realistic, but are readily washed with ordinary soap and water or detergent, and instantly resume their original shape regardless of how hard they are crushed or thrown about.

I have discovered also, that by using this type stem, it is an excellent and economical means of applying the cement to the material for home workers' and children's kits. By inserting the stem after the cement has been applied directly into the body of the flower, there is a saving on cement as it would otherwise harden on the stem and be rendered useless. Furthermore, the solvent in the cement causes the foam rubber to spread making it easy to insert the stem into the pep or bud. Where stems are dyed with a different color on each end such as green and red, a dip into alcohol or other solvent such as used in the cement allows it to be used for tinting purposes prior to applying adhesion.

The material itself, with the support of the adhesive, at the stem is sufficient to cause a definite vertical separation of the petals, such as in flatter type flowers. Where it is desirable to secure greater separation or impart greater stiffness to the petal, a double thickness of material cemented at the stem accomplishes the result, or a single piece if doubled over will create two petals with greater separation.

These techniques are applied to practically all artificial flowers, but it is necessary to gage the thickness of the material in order that the desired effect can be obtained. As an example a very long petal flower such as an Easter lily will take its prescribed contours through the use of material ⅛ of an inch thick, and the petal will not wilt, bend, or droop, by the unsupported weights of its outer portions. On the other hand, an orchid must be made of a material preferably ¹⁄₃₂ of an inch thick, and to support the outermost portions of these petals, the material may either be split angularly and die-cut so that the portion nearest the stem is thicker, or, if desired, it can be supported from the stem outwardly as far as is required by cementing to the petal a very thin strip of cellulose acetate which in turn is hidden by a thin piece of foam rubber or other desirable material over its outer portion. In actual practice, I laminate a thin piece of foam rubber to an acetate sheet and then die-cut the composition of the desired shape as reinforcement.

Referring now particularly to the drawings, for examples of the application of the general discussion above to specific cases, Figs. 1 to 18 relate to a group of rose buds, such as shown completed in Fig. 1. The parts, shown separately in Figs. 2 to 5, are a leaf or leaf part 1 (Fig. 2), a plurality of petal parts 2 (Fig. 3), of the desired color, a plurality of culot parts 3 (Fig. 4) of the desired color, and a flexible stem 4 (Fig. 5) usually of green color, formed of two finely twisted, flexible wires into which cloth was inserted during the twisting. A conventional pipe stem cleaner is a very satisfactory, abundant, and inexpensive stem for this purpose when stems up to 6 inches in length are desired, and it can be flexed into different forms which it will retain. The cloth worked between the wires during the twisting will receive and hold a dye and cement. A bottle of quick setting, non-retacking cement that is flexible and water insoluble upon setting, such as a plastic cement or neoprene cement with a volatile solvent, is also used, but is not illustrated. It is available in the open market. The leaf 1, petal parts 2, and culot parts 3 are cut to proper outlines from thin sheets of split, foam latex not more than ¹⁄₁₆ inch thick.

To form the cluster of rose buds, the procedure will be described step by step. Five of the petal parts 2 are arranged corner to corner in a row, as shown in Fig. 6. Then a coating of the cement is applied to corresponding corners, as shown by the stippled areas in Fig. 6. Next the petal parts so prepared are moved closer together into progressively overlapping relation, as shown in Fig. 7, after which the overlapping corners are pressed firmly together. Next a layer of the cement is applied to the lower half of the five connected petal parts as shown by the stippled areas in Fig. 8. One end of the stem is first dipped for about ½ inch into the cement and the cement coated end then laid flat on the outside edge of the first petal part as shown in Fig. 9, and pressed firm with the finger as the stem and petal parts are rolled slowly into a bud, as shown in Fig. 11. Next three of the culot parts 3, are arranged in a row, and corresponding corners then coated with some of the cement, as shown by the stippling in Fig. 12. These culot parts are then placed with their corners in progressively overlapping relation, as shown in Fig. 13, and overlapping corners pressed together. A coating of the cement is then applied to one exposed face of the overlapping parts 3 as shown by the stippling in Fig. 14. A coating of the cement is now applied all around the lower half of the bud (of Fig. 11) as shown by the stippling in Fig. 15. The cement coated part of the bud is then placed against the cement coated face of the attached culots 3 of Fig. 14 with the bottom of the bud about ⅛ inch above the bottom of the first culot part in the series, as shown in Fig. 16, and the bud rolled up in the culots 3, into the form shown in Fig. 17. The bottom tips of the culots 3 are then pinched to the stem 4. This process is then repeated to make a plurality of such buds. Then one twists together the stems of several of such buds to form a spray, as shown in Fig. 19. Next, a coating of the cement is applied to the interior area of a face of one of the leaves 1, as shown by the stippling in Fig. 18. The intertwisted buds, not the stems thereof, are then pressed against the cement coating on the leaf. When the cement has set, the buds are arranged to suit the individual's taste, as shown in Fig. 1.

In applying the cement, one applies only enough to slightly penetrate the porous surface of the parts being coated. If no tension is involved, one may immediately press another petal part or leaf directly to the cement coating, before the cement sets. Pressing such parts together with the fingers will cause the cement to penetrate the other, uncoated part and adhere thereto. Where tension is involved, such as by rolling a petal part back slightly to give it a desired form or contour, it is advisable to let the cement dry about a minute and it will then hold instantly. After about 5 minutes the cement is semi-permanent, and after about a half hour it is fully permanent.

In Figs. 20 to 43 inclusive, the successive steps in making a pansy are illustrated and will now be described. The parts used are illustrated in Fig. 20 (except the fine pollen parts) and include a number of petal parts 6 suitably colored, a culot part 7 suitably colored, a pipe stem cleaner 8 colored green, and some loose finely divided particles of the foam latex (not shown) suitably colored to function as pollen. The first step is to apply some of the cement to the lower right marginal edge of a petal part 6 as shown by the stippling in Fig. 21. A second petal part is then pressed over the cement coating, in the relative position shown in Fig. 22. The lower left marginal edge of a third petal part 6 is given a coating of cement, as shown by the stippling in Fig. 23, and the first two petal parts then pressed against the coating on the third petal part, in the relative positions shown in Fig. 24, with the second petal part actually engaging the cement coating on the margin of the third petal part. A spot of the cement is then applied to the lower edge of the middle petal part as shown by the stippling in Fig. 26. Next apply one end of stem 8 to this coating last mentioned, as shown in Fig. 26, then fold the three petals in half with the stem 8 inside into the position shown in Fig. 27. Apply cement to the lower marginal edges of a fourth petal part as shown by the stippling in Fig. 28, then invert the assembled parts from Fig. 27 and apply the fourth petal part to the assembled parts in the direction of the arrow in Fig. 29, with the cement coated margins of the fourth petal engaging the bottoms of the other petal parts. The petal parts are pressed firmly together to provide the assembly shown in 2 views in Figs. 30 and 31. If the fourth petal part does not lie flat and down, apply a little of the cement to the back surface of that part and pinch it at the cement, which creates the product shown in different views in Figs. 32 and 33. The lower marginal edges of a fifth petal part are next coated with the cement as shown by the stippling in Fig. 34, and this part is then pressed against the other petal parts in the manner shown in Fig. 35, with the cement of the fifth petal part engaging the other petal parts, but with this petal part about ⅛ inch from the stem. This creates the product shown in front view in Fig. 36. A coating of the cement is now applied to the entire surface of one of the culot parts 7 as shown by the stippling in Fig. 37. This coated culot part 7 is then press-twisted upon the stem 8 and against the bottom of the flower, with the coating engaging the petal parts to provide the article shown in Fig. 39. The center of the assembled petal parts is then given some cement as shown by the stippling in Fig. 40. Some of the finely divided, loose particles 9 (Fig. 41) of the foam latex, colored to represent pollen, are placed on a surface and the coated surface of the flower pressed against the pollen particles as shown in Figs. 41 and 42. Excess pollen particles are then brushed off, which gives the completed pansy shown in Fig. 43.

Figs. 44 to 60 inclusive illustrate the successive steps in the making of a ranunculus flower. The parts required are illustrated as a group in Fig. 44 and include a plurality of petals 10, a culot 11, a pep 12, and a stem 13, all dyed to the desired colors. The petals 10 and culot 11 are cut from thin sheets of split foam latex, the pep is also of the split foam latex, and stem 13 is a pipe stem cleaner. One of the petals 10 is coated along 2 margins with some of the cement, as shown by the stippling in Fig. 45. A second petal 10 is placed on the first petal against the cement as shown in Fig. 46. Some of the cement is now applied to the right side of the second petal 10 as shown by stippling in Fig. 47, and a third petal 10 is pressed on this fresh cement as shown in Fig. 48. This process of adding petals 10 is continued until five petals have been added, as shown in Fig. 49. One end of the stem 13 is dipped in the cement and then pushed endwise into one end of the pep 12 until the advancing end of the stem is even with the other end of the pep as shown in Fig. 50. The side surface of the pep is then coated with some of the cement (see Fig. 51). The free end of the stem 13 is then pushed downwardly through the center of the assembled petals (Fig. 52) until the pep 12 engages with the petals (Fig. 53). The petals are the pressed up against the pep so that they adhere to the pep (Fig. 54). A coating of the cement is then applied to a face of the culot, as shown by the stippling in Fig. 55, and then the free end of stem 13 is pushed through the culot from the cement-coated face (Fig. 56) until the culot abuts snugly against the petals (Fig. 57). A dab of the cement is next placed on the center of the back face of each petal, as shown by stippling in Fig. 58. Next pinch each petal where the cement is, which deforms the petals, as shown in Fig. 59, which produces the finished flower of Fig. 60.

Figs. 61 to 76 inclusive illustrate the successive steps to be followed in making a daffodil flower. The parts required are illustrated as a group in Fig. 61 and include a plurality of broad petals 14, and narrow petals 15, culot 16, a center part 17 having slots 18 cut into one end thereof, and a pipe stem cleaner 19. The parts 14, 15, 16 and 17 are cut into the desired shapes from thin sheets of split foam latex, dyed to the desired colors, the same as the parts 2 and 3 of Figs. 3 and 4. The first step is to apply some of the cement as a coating to one face of the base part 17, as shown by the stippling in Fig. 62. This is temporarily set aside. Next, one of the petals 14 is coated on one face with the cement along two of its side margins, as shown by stippling in Fig. 63. Two more petals 14 are pressed against the coated edge margins of the first petal 14 (Fig. 64). Next, one end of the stem 19 is placed against the cement on the base 17 and the base rolled tightly around the stem end, and the overlap pinched to hold tightly (Fig. 65). Then apply a coating of the cement along one marginal side of one of the petals 14 as shown by stippling in Fig. 66, and this last applied cement coating is then pressed against the opposite, free side margin of the connected petals 14 to form the cup (Fig. 67). The free end of the stem 19 is then dipped in the cement and inserted through the top of the cup of Fig. 67, until it reaches the positions shown in Fig. 68. The tips of five of the narrow petals 15 are then coated with the cement as shown by the stippling in Fig. 69. These coated tips are then pressed against the base of the cup of Fig. 68, evenly about the base of the cup, overlapping the coated tip ends if necessary for them to fit evenly (Fig. 70). A face of the culot 16 is then coated with the cement as shown by the stippling in Fig. 71. The free end of stem 19 is then pushed through the center of the cement-coated culot, first through the coated face and the coated face of the culot then pressed tightly against the base of the flower assembly (Fig. 72), after which light dots of the cement are applied to the free ends of the narrow petals 15 as shown by the stippling in Fig. 73. These dots of cement are allowed to dry about one minute, and then the free ends of each of these petals 15 is pinched together while being pulled gently to shape them Fig. 74). A thin line coating of the cement is next applied to the upper, outer edge of the petals 14, as shown by the row of dots 20 in Fig. 75, and allowed to dry for one minute. These coated edges are then rolled outwardly to the desired contour, but are not folded or bent which provides the complete flower shown in Fig. 76.

Flowers made in this manenr are elastic and unaffected by water, so that when soiled they may be agitated in an aqueous detergent solution, then rinsed, squeezed, and dried, without being damaged. When crushed, they are unharmed and will spring back to original shape and condition as soon as released.

It will be understood that various changes in the details, materials and arrangements of parts, which has been herein described and illustrated in order to explain the nature of the invention, may be made by those skilled in the art, within the principle and scope of the invention, as expressed in the appended claim.

I claim:

The method of making an artificial flower that may be washed and squeezed without damage to it and without permanent change in its formation, which comprises dividing thin sheets of split foam latex into approximately the shapes and sizes of the petals and culots of a flower being simulated, coating corresponding portions, less than the whole, of faces of a plurality of petal parts with a quick setting, latex cement containing a readily vaporizable solvent for the latex and which is flexible and water insoluble upon setting, assembling these petal parts in a row in progressively overlapping relation with the cement cated area of each petal part covered by the overlapping petal part, applying a coating of such cement to a marginal face area of the row of connected petal parts, pressing against the cement coated face of one end of said row, one end portion of a stem formed of flexible wires disposed side by side and intertwisted, with fabric interposed between the intertwisted wires, with fresh cement between the row of parts and said stem end, rolling the stem and row of petal parts into a bud, coating corresponding corners of a plurality of culot parts with some of said cement, arranging these coated culot parts and an uncoated culot part in a row with their corners in progressively overlapping relation and with the coated corners concealed by the overlapping culot parts and the uncoated culot part last in the row, then encircling the lower portion of said bud and an adjacent portion of said stem with said row of culot parts, with some of said cement between the row of culot parts and said bud and stem.

References Cited in the file of this patent

UNITED STATES PATENTS

| | | |
|---|---|---|
| 490,170 | Souchet | Jan. 17, 1893 |
| 815,005 | Case | Mar. 13, 1906 |
| 1,188,088 | Malstrom | June 20, 1916 |
| 2,054,605 | Rogers | Sept. 15, 1936 |

OTHER REFERENCES

Pamphlet on "Bow to Make Flowers," published by Dennison Mfg. Co., 1948, Framingham, Mass., pg. 30 (Poinsettia).